United States Patent [19]

Bauer

[11] Patent Number: 5,496,059
[45] Date of Patent: Mar. 5, 1996

[54] AIR BAG INSTALLATION USING INTEGRATED ENERGY DEVICE TO FORM TRIM PIECE AIR BAG DEPLOYMENT OPENINGS

[75] Inventor: David J. Bauer, West Bloomfield, Mich.

[73] Assignee: Tip Engineering Group, Inc., Farmington Hills, Mich.

[21] Appl. No.: 329,475

[22] Filed: Oct. 26, 1994

[51] Int. Cl.$^6$ .................................................. B60R 21/16
[52] U.S. Cl. ........................................ 280/728.3; 280/732
[58] Field of Search ......................... 280/728 B, 730 A, 280/732; 102/275.1, 275.8, 202.7, 325, 326, 307

[56] References Cited

U.S. PATENT DOCUMENTS

| | | |
|---|---|---|
| 4,991,870 | 2/1991 | Beusterien et al. ............... 280/732 |
| 5,080,393 | 1/1992 | Dixon, Jr. et al. ............... 280/732 |
| 5,082,310 | 1/1992 | Bauer . |
| 5,181,737 | 1/1993 | Lenzen et al. . |
| 5,217,244 | 6/1993 | Bauer ............... 280/732 |
| 5,231,928 | 8/1993 | Phillips et al. . |

FOREIGN PATENT DOCUMENTS 381144  8/1990  European Pat. Off. .......... 280/728 B

*Primary Examiner*—Eric D. Culbreth
*Attorney, Agent, or Firm*—John R. Benefiel

[57] ABSTRACT

An air bag installation is disclosed in which a flattened tube is expanded by a flow of pressurized gas from the air bag inflator or a separate source when the air bag system is deployed. The resulting tube expansion drives a cutting edge to sever an opening in a covering layer disposed over a substrate panel of an interior trim structure. A pyrotechnic charge may be used to augment the flow of pressurized gas. The tube may alternatively form an integral part of the instrument panel or the air bag assembly.

12 Claims, 6 Drawing Sheets

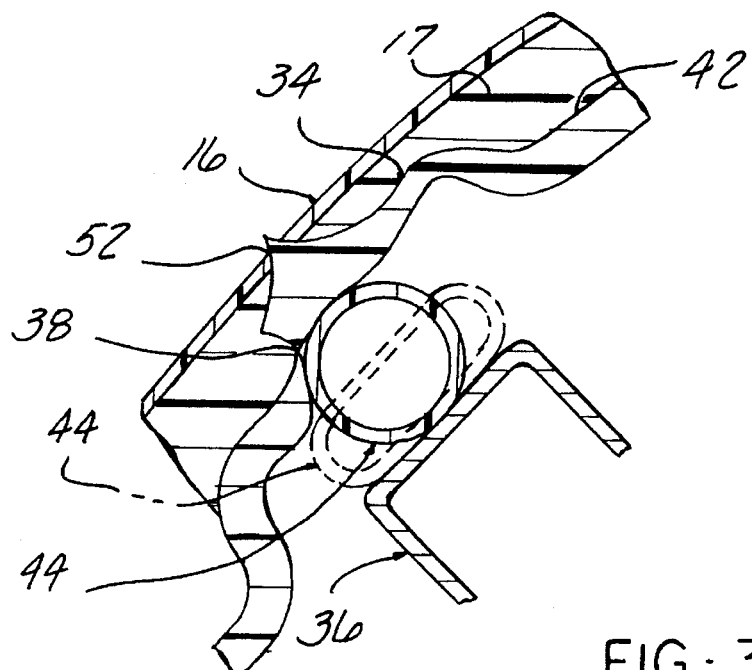
FIG·3
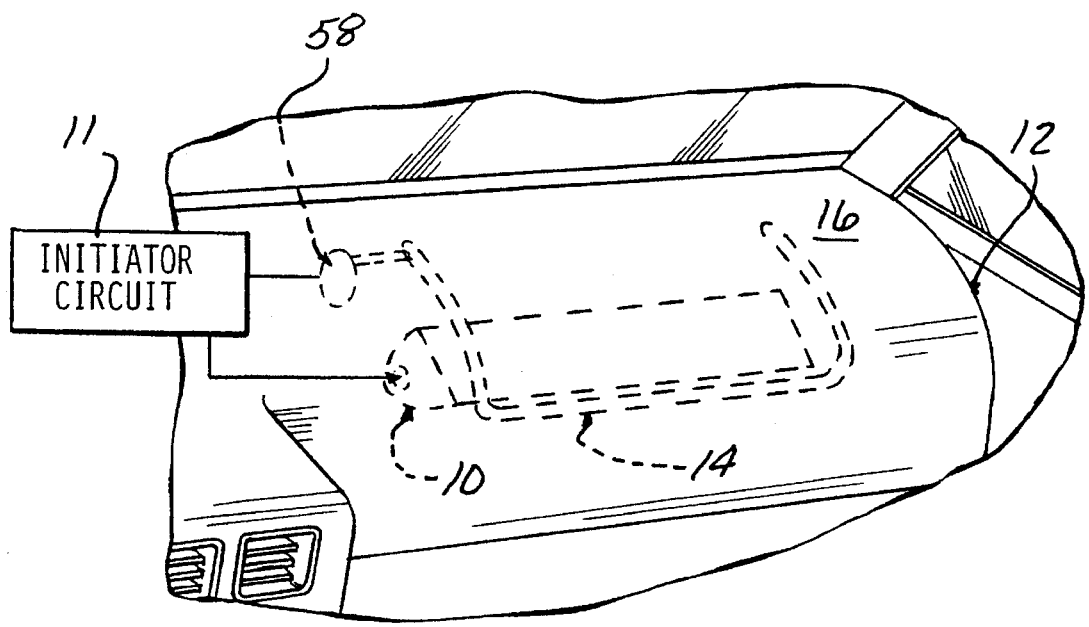
FIG·4

AIR BAG INSTALLATION USING INTEGRATED ENERGY DEVICE TO FORM TRIM PIECE AIR BAG DEPLOYMENT OPENINGS

BACKGROUND OF THE INVENTION

1. Field of the Invention

This invention concerns air bag systems and more particularly arrangements to form air deployment openings in an interior trim structure behind which an air bag receptacle is stored.

2. Description of the Prior Art

A folded air bag is usually stowed in a receptacle mounted behind a trim piece in the passenger compartment of the vehicle equipped with the air bag.

In some designs, the trim structure is formed with a smooth, uninterrupted decorative covering layer overlying an air bag deployment opening, and an opening must be formed in the covering layer by severing of the covering layer in a pattern forming the deployment opening.

This severing step must be accomplished within a very short time after initiation of the air bag deployment sequence so as to not retard and thus adversely affect proper deployment of the air bag as it is inflated by its inflation device. The air bag inflator device acts extremely rapidly to generate a large volume of gas which is used to inflate the folded air bag which moves through the aligned opening formed in the trim piece in being deployed into the passenger compartment.

There has previously been devised various arrangements for severing the covering layer, which is typically constructed of relatively tough vinyl plastic.

In U.S. Pat. No. 5,080,393 issued on Jan. 14, 1992, for "METHOD AND APPARATUS FOR FORMING AN AIR BAG DEPLOYMENT OPENING"; U.S. Pat. No. 5,217,244 issued on Jun. 8, 1993, for "ARRANGEMENT FOR FORMING AN AIR BAG DEPLOYMENT OPENING"; U.S. Pat. No. 4,991,870 issued on Feb. 12, 1991, for "METHOD AND ARRANGEMENT FOR FORMING AN AIR BAG DEPLOYMENT OPENING IN AN AUTO INTERIOR TRIM PIECE" there are described various pyrotechnic linear energy generating elements which cause a severing of the covering layer by the energy released by activation of a pyrotechnic or other chemical reaction, either by direct or indirect application of the released energy.

U.S. Pat. No. 5,082,310 issued on Jan. 21, 1992, for an "ARRANGEMENT FOR PROVIDING AN AIR BAG DEPLOYMENT OPENING" describes a mechanical cutting edge driven by the air bag inflation to sever the covering layer.

In U.S. application Ser. No. 08/210,503, filed on Mar. 18, 1994, for "Method and Arrangement for Forming an Air Bag Deployment Opening", now abandoned in favor of copending continuing application Ser. No. 08/279,225, filed on Jul. 22, 1994, there is described a flattened tube which is rapidly expanded by discharge of a pyrotechnic material, the expansion of the tube used to drive various cutting edge arrangements to execute cutting of the covering layer.

In those arrangements using a separate source of energy from the air bag inflation, a critical consideration is the need to initiate the cutting action at a sufficient interval before air bag inflation but after the system deployment sequence is initiated.

Another important consideration is the assembly and handling of a separate energy generating element, particularly where the element must generate sufficient energy to itself sever the covering layer.

Accordingly, it is an object of the present invention to provide an improved instrument panel or air bag assembly having an integral arrangement for severing a covering layer overlying an air bag receptacle in which assembly and handling of a linear element used to sever the covering layer is simplified.

It is a further object to provide such an arrangement in which the components necessary to insure properly timed activation are simplified.

SUMMARY OF THE INVENTION

The present invention comprises an instrument panel or air bag assembly combined with an integral arrangement for severing the instrument panel covering layer comprised of a length of flattened tube which extends in a pattern corresponding to that to be cut in the covering layer, the tube disposed on a pedestal of a reaction frame underlying the covering layer and defining at least in part the perimeter of the deployment opening to be formed. The flattened tube is supplied with a flow of high pressure gas at the start of the air bag deployment sufficient to cause distension of the flattened tube, this distension causing driving of a cutting edge into the underside of the covering layer to sever the same in the pattern necessary for formation of the deployment opening.

In one embodiment the flow of gas is supplied by a fluid tap of the air bag inflator device, in which a small volume of the inflator gas is used to expand and round out the flattened tube at the moment air bag deployment begins.

In a second embodiment a separate gas generator is activated by the same circuitry operating the air bag inflator device with a pressure tap extending to the flattened tube to cause distension of the flattened tube in the same manner.

In both embodiments, the effect of the externally supplied gas flow can be augmented with a chemical charge contained within the flattened tube, which is activated at the same time.

The flattened tube is affixed to a reaction frame by welding or various mechanical attachments, or a combination of both.

The reaction frame itself may be attached to the air bag receptacle, or integrally formed with the receptacle to form a separate assembly from the interior trim piece.

The preferred cutting edge arrangement comprises a perimeter portion of a deployment door substrate panel, which is grooved or notched to break free from a fastened outermost portion of the perimeter. When the tube is expanded, an outwardly projecting ridge on the outer surface of the perimeter portion is driven into the underside of the covering layer to sever the same.

DESCRIPTION OF THE DRAWINGS

FIG. 3 is an enlarged fragmentary section of a flattened tube element shown in phantom lines, with the tube also shown expanded in full lines, together with adjacent door substrate panel portions showing the details of those portions.

FIG. 4 is a perspective view of an instrument panel depicting a second embodiment of an air bag installation according to the invention.

DETAILED DESCRIPTION

In the following detailed description certain specific terminology will be employed for the sake of clarity and a particular embodiment described in accordance with the requirements of 35 USC 112, but it is to be understood that the same is not intended to be limiting inasmuch as the invention is capable of taking many forms and various within the scope of the appended claims.

Figure 1:
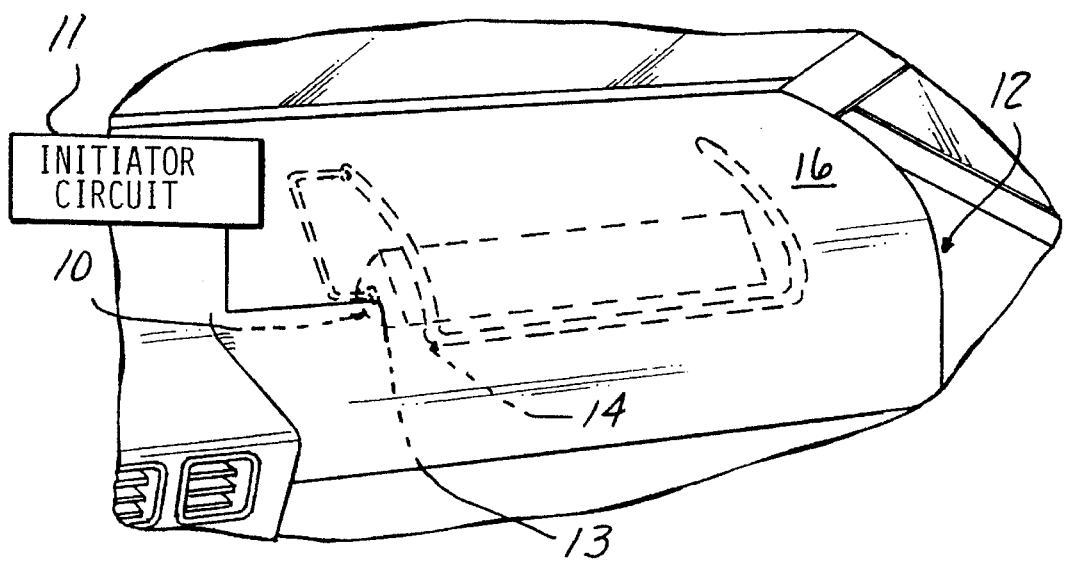
FIG. 1 is a fragmentary perspective view of the passenger side of an instrument panel depicting a typical air bag installation.

Referring to the drawings, FIG. 1 shows an external view of a passenger side air bag installation, in which an air bag receptacle 10 is mounted behind an instrument panel 12 comprising an interior trim piece or structure lining in part the passenger compartment of a vehicle equipped with an air bag system. The air bag is inflated by a triggering circuit 11 which causes activation of a gas generator 13 included in the receptacle 10.

The receptacle 10 is completely concealed by the covering layer extending completely over instrument panel 12 and it is necessary to form a deployment opening pattern 14 by a linear tube by inflation of severing into the outer covering layer 16 at the instant the air bag system deployment is initiated. The covering layer 16 is typically constructed of vinyl plastic and underlain by a molded foam 17. While a "U" pattern is shown, other patterns are known, particularly for multiple deployment door installations.

Figure 2A:
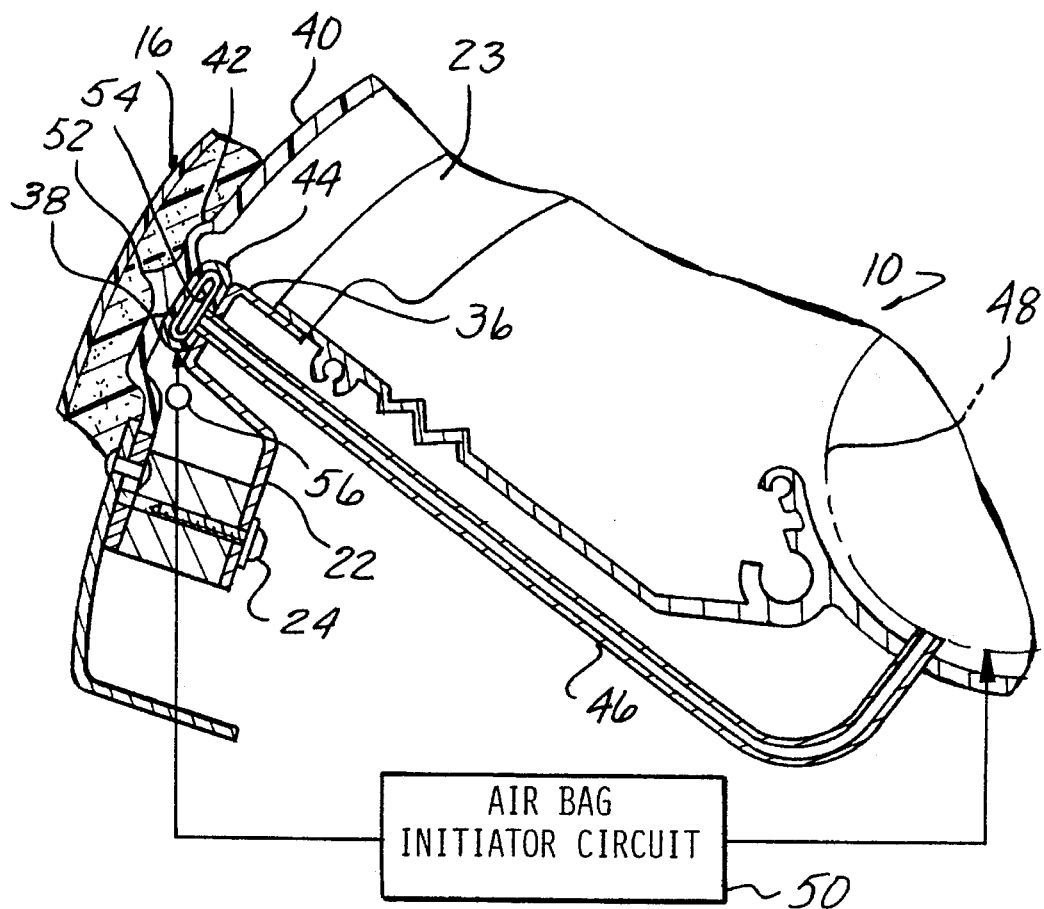
FIG. 2A is a sectional view of an air bag receptacle illustrating a variation of the arrangement shown in FIG. 2.
Figure 2:
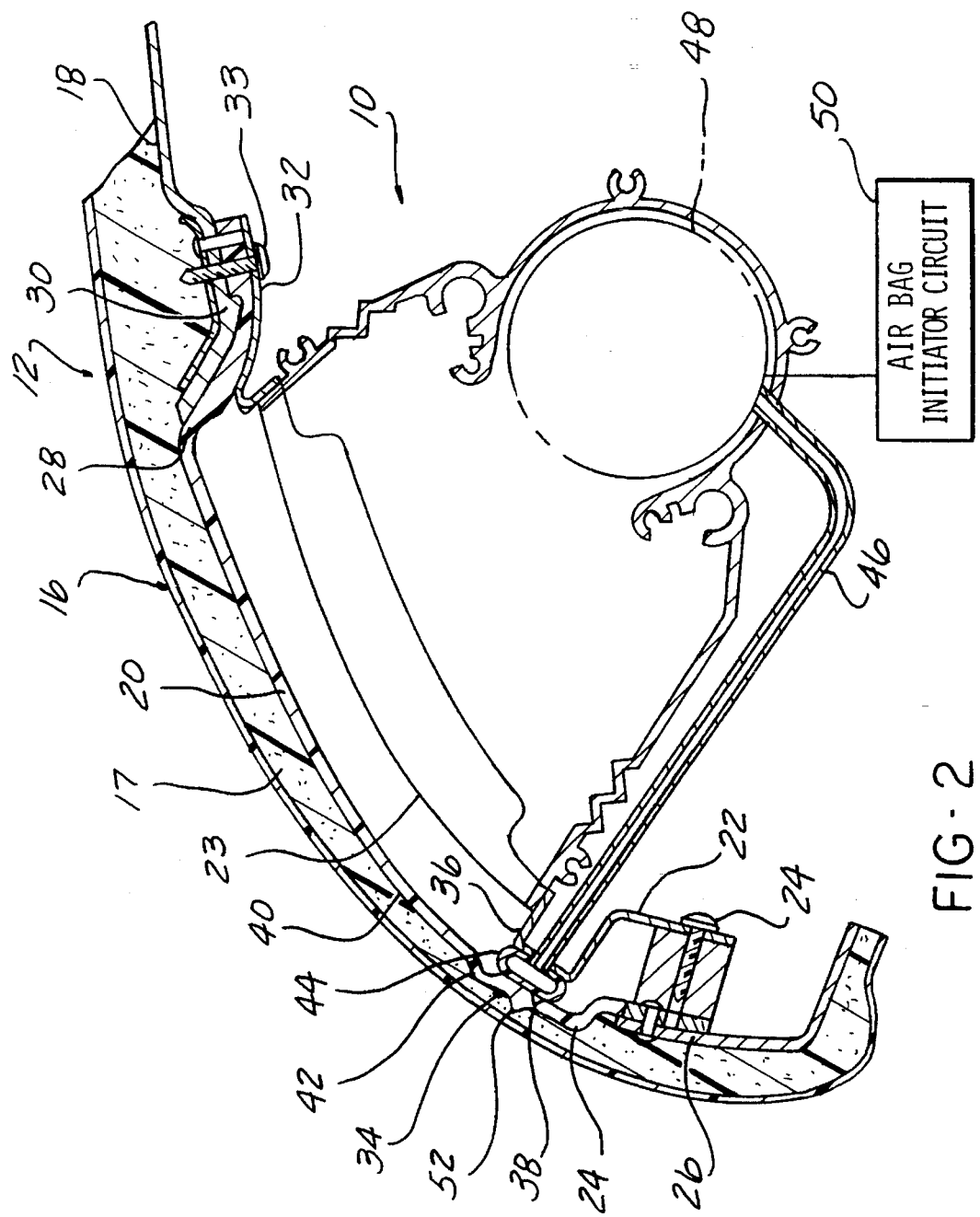
FIG. 2 is a transverse sectional view through the instrument panel shown in FIG. 1 showing details of a first embodiment of the arrangement according to the present invention with a diagrammatic representation of the air bag initiation circuitry.

FIG. 2 reveals the details of the arrangement according to the present invention.

The instrument panel 12 includes the covering layer 16 which smoothly and uninterruptedly extends over a substrate panel 18, and a hinged door substrate panel 20 interfit into an opening in the instrument panel substrate 18. The opening and door substrate panel 20 are configured in the rectangular shape of the U-pattern shown in FIG. 1.

The air bag receptacle 10 is mounted to a rigid reaction frame 22 by welds to side pieces 23 mounted to the instrument panel substrate 18 by screws 24.

The reaction frame 22 rigid portions extend along the three sides of the U-pattern being much less rigid along the hinging side of the door panel 20.

The deployment door substrate panel 20 has a perimeter portion also extending along the three sides, underlaying a surrounding border portion 26 of the instrument panel substrate 18 and riveted thereto. The fourth side of the deployment door substrate panel 20 has a hinging flap 28 integral therewith which also is affixed beneath a portion 30 of the instrument panel substrate 18, and underlain by a reinforcing layer 32 extending from the reaction frame, screws 33 fastening all three layers together.

The deployment door substrate panel 20 also has a cutting edge perimeter portion 34 extending in a three-sided pattern over a pedestal portion 36 of the reaction frame 22 extending around the deployment opening.

The cutting edge perimeter portion 34 is connected to the outermost perimeter portion 24 by a notched or grooved bridge 38, and the main panel 40 by a flexible reduced thickness segment 42.

Interposed between the pedestal 36 of the reaction frame 22 and the segment 34 is a flattened tube element 44, also extending in the same three-sided pattern.

The flattened tube 44 is described in copending U.S. application Ser. No. 08/210,503, filed on Mar. 18, 1994, now abandoned, and continuation application Ser. No. 08/279,225, filed on Jul. 22, 1994.

However, in the arrangement according to the present invention, there is provided a pressure tap tube 46 extending to the air bag inflator device 48 contained in the air bag receptacle 10 so as to direct a flow of gas therefrom into the interior of the tube 44 when the air bag inflator device is itself activated.

The pressure top tube 46 must be of a size and strength to enable sufficient flow of gas under high pressure to fully distend the flattened tube 44 prior to deployment of the air bag and to withstand the high pressure of that gas.

FIG. 3 shows that as the flattened tube 44 expands, the bridging portion 38 is sheared, freeing segment 34 to swing out about the hinging section 42.

A ridge 52 is integrally formed into the outer surface of the perimeter portion 34, which is driven into the severing layer 16 to sever the same.

Thus, operation of the air bag initiator circuit 50 automatically causes the expansion of the flattened tube 44 at the instant before the air bag is inflated.

This sequence frees the deployment door panel 20 to swing open by swinging about the hinge flap 30 as the air bag inflates pushing on the inside surface of the panel 20.

The effect of the inflator gas flow may be augmented as shown in FIG. 2A, by adding a reduced chemical charge or coating 54 on the interior of the flattened tube 44, which is discharged by a detonator 56 set off by an impulse from the air bag initiator circuit 50.

Figure 4A:
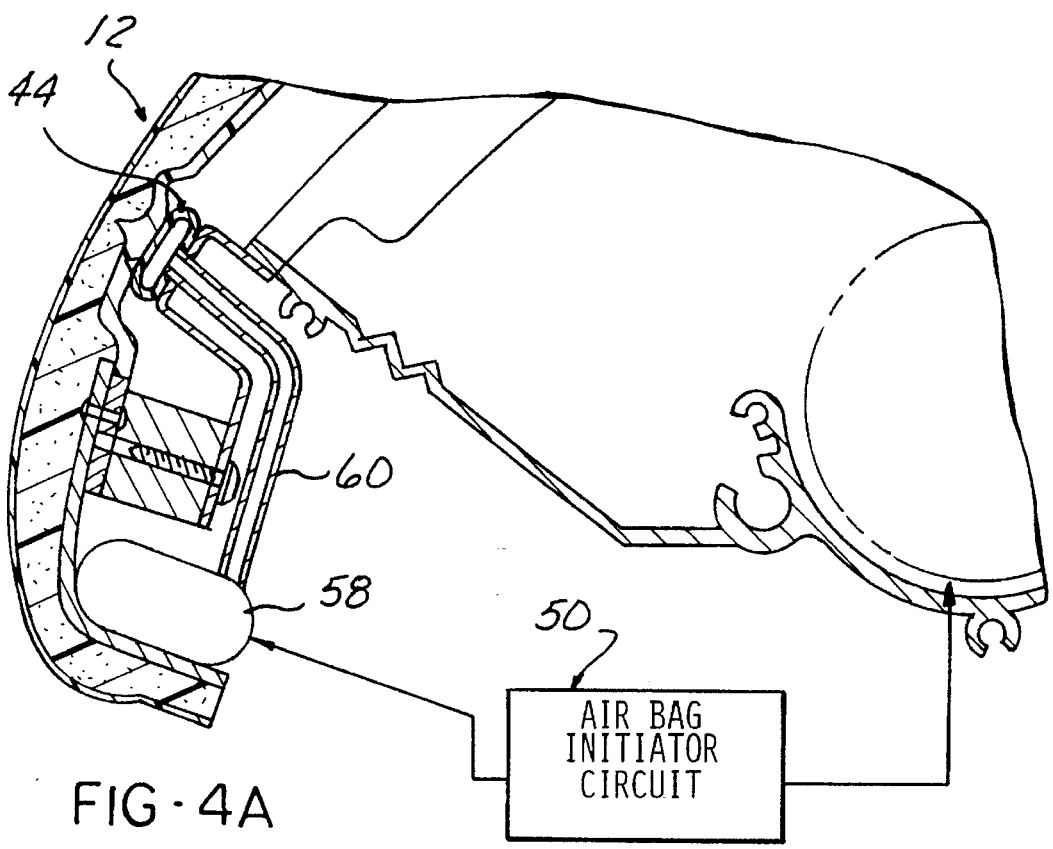
FIG. 4A is a sectional view through an instrument panel, air bag receptacle, and deployment door substrate assembly incorporating an arrangement according to the second embodiment of the invention.

FIGS. 4 and 4A show an alternate arrangement in which a separate gas generator 58 is employed, which can consist of a similar generator as used in the air bag canister but which is located mounted beneath the instrument panel 12 closely adjacent a flattened tube linear element 44 connected by means of a pressure line 60 communicating a flow of pressurized gas into the interior of the flattened element 44.

The separate gas generator 58 is wired to the air bag initiator circuit 50 so as to be energized as the air bag system is activated.

Figure 4B:
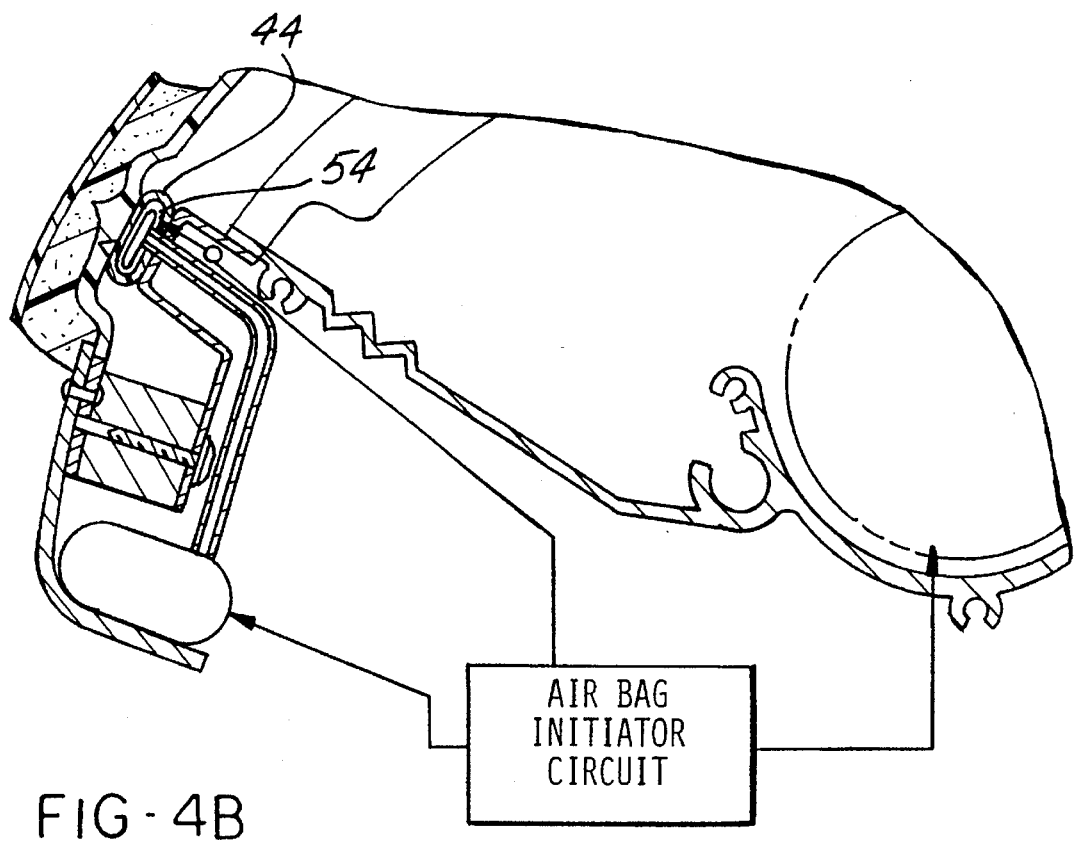
FIG. 4B is a view of the section shown in FIG. 4 illustrating a variation of that arrangement.

As shown in FIG. 4B, the flattened tube element 44 can also have a chemical coating 54 which is also activated by a connection to the air bag initiator 50 such that the flattened tube element 44 is inflated by the combined effects of the gas flow from the independent gas generator 58 as well as the discharge of the chemical charge 54.

Figure 5:
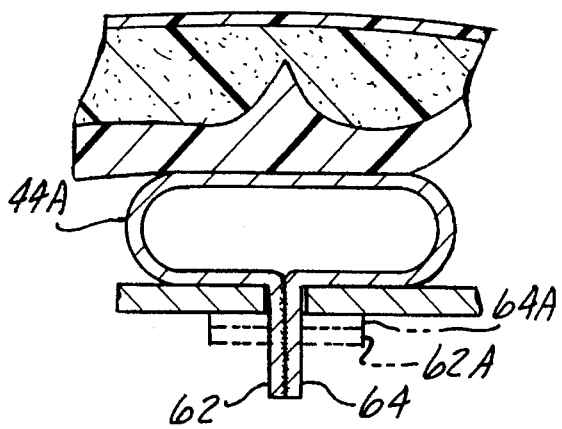
FIGS. 5–10 are transverse enlarged sectional views taken across a flattened tube element and supporting pedestal of a reaction frame, showing various alternate attachments.

FIGS. 5–10 illustrate various arrangements for connecting the flattened tube element 44 to the instrument panel substrate 18 to the frame pedestal 36 so that the tube 44 is an integral part of the instrument panel assembly. In FIG. 5, a flattened tube element 44A is formed with tab flanges 62, 64 which are welded together and having periodically having sections 62A, 64A formed over against the underside of the pedestal 36. Both tabs extend through a slot in the pedestal 36.

Figure 6:
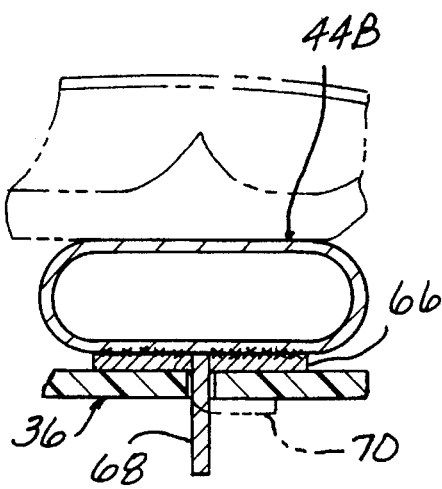

In FIG. 6, a separate mounting flange 66 is welded to the underside of the flattened tube 44B and which has a flange 68 having portions 70 thereof formed over to the under surface of the pedestal 36.

Figure 7:
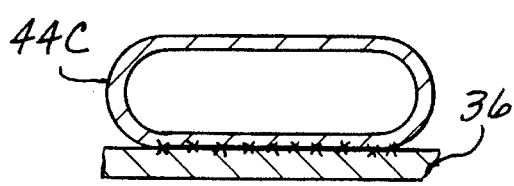

In FIG. 7, the flattened tube 44C is simply welded directly to the outer surface of the pedestal 36.

Figure 8:
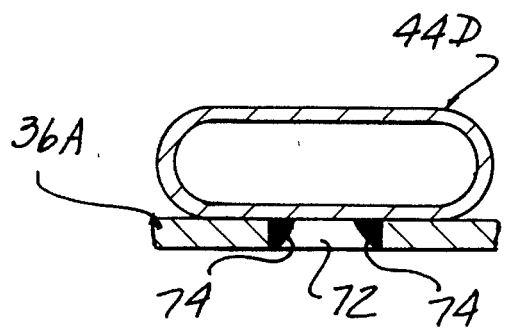

In FIG. 8, a wide slot 72 is formed in the pedestal 36A and welds 74 applied in the corners formed between the wall sides and the lower surface of the flattened tube 44D.

Figure 9:
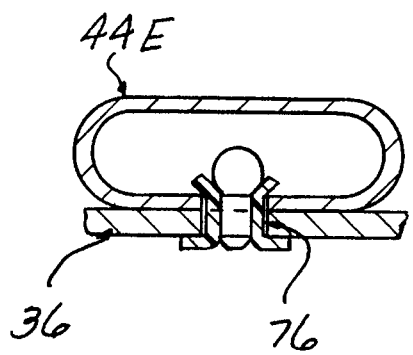

In FIG. 9, the flattened tube 44E is riveted by means of a pop rivet 76 to the pedestal 36.

Figure 10:
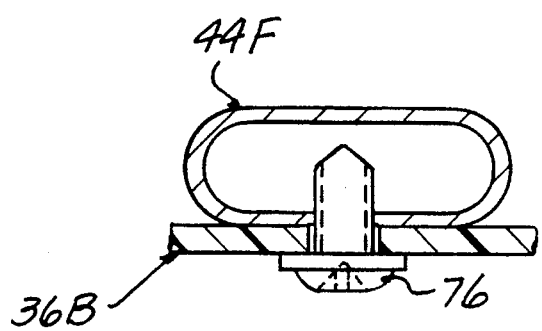

Finally, in FIG. 10, the flattened tube 44F is mounted by means of a tapping screw 76 received in a bore in the pedestal 36B and threadably penetrating the lower wall of the flattened tube 44F.

In each case the flattened tube 44 may be constructed of thin wall aluminum, i.e., 0.032 inches wall thickness. The initial tube being formed of 0.56 inches OD aluminum tube flattened such that the height is equal to 0.25 inches and the width 0.75 inches. Other materials such as a suitable plastic can be used.

Many other forms of attachment are possible and will be clear to one skilled in the art.

Figure 11:
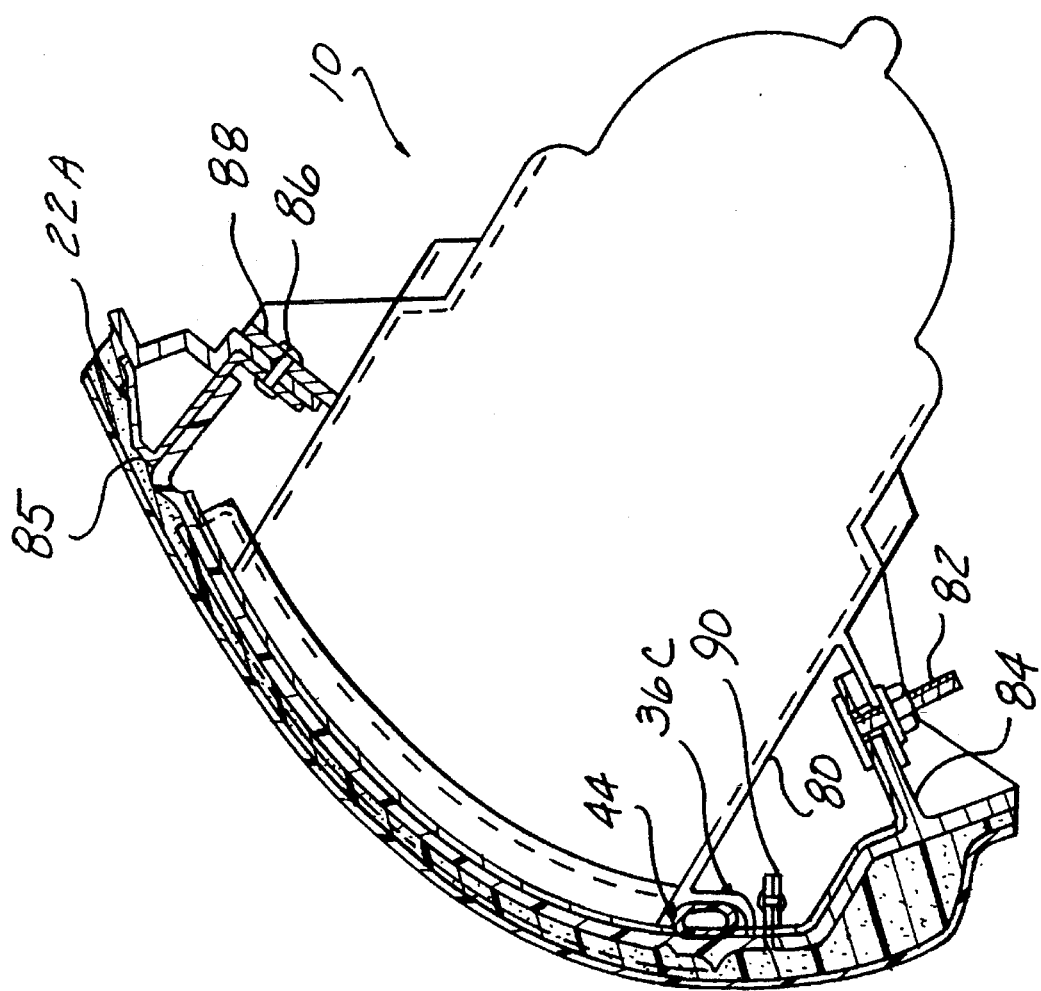
FIG. 11 is a sectional view through an instrument panel and air bag receptacle incorporating an integral perimeter channel to mount a flattened tube element.

Referring to FIG. 11, an alternate construction for the pedestal is shown in which a channel like structure 36C is formed integrally with a air bag canister 80 which in turn may be cast from metal or molded from suitable plastic. The flattened tube 44 rests within the open channel 36C as shown.

In this instance, the air bag canister 10 including the flattened tube 44 may be separately assembled and installed to the instrument panel assembly as a unit. The air bag canister attached by means of threaded fasteners 82 to a flange 84 on the instrument panel substrate as well as to the threaded fasteners 86 to a second flange 88 abutting a portion of the instrument panel frame 22. By this approach the components which must be activated are shipped and assembled as a unit, i.e., the air bag canister 10 and the flattened tube 44.

The frame 22A is formed with a portion 85 which has the hinging section of the door substrate affixed thereto which is also captured by the fastener 86. In the region of the channel 36C, the frame 22A is constituted by a flange section 90 riveted to a liner 92 secured by means of the threaded fasteners 82 to the instrument panel substrate 84 as is shown.

I claim:

1. In combination, an air bag assembly including an air bag receptacle container, a folded air bag and an inflator device for generating an inflating gas flow, and an initiator circuit for activating said inflator device;

an interior trim structure having a substrate panel and a covering layer;

a deployment opening formed in said interior trim structure substrate panel with a hinge deployment door panel fit in said deployment opening, said covering layer smoothly extending over said deployment door panel and adjacent regions of said substrate panel;

said air bag receptacle mounted aligned with said deployment opening;

a flattened tube mounted beneath said covering layer and extending around said deployment opening;

an outwardly directed cutting edge extending along said flattened tube and located to be forced into said covering layer upon expansion of said flattened tube;

a gas pressure source activatable to generate a gas flow upon initiation of said air bag inflation; and, a fluid passage connecting said gas pressure source and said flattened tube causing a gas flow into said flattened tube to occur upon initiation of said air bag inflation to cause said flattened tube to expand and said cutting edge to be driven to sever said covering layer about said substrate panel deployment opening.

2. The combination according to claim 1 wherein said gas pressure source comprises said air bag inflation device whereby a portion of the gas flow used to inflate said air bag is directed to said flattened tube to cause said expansion thereof.

3. The combination according to claim 1 wherein said gas pressure source is separate from said air bag assembly.

4. The combination according to claim 1 further including a charge of pyrotechnic material in said flattened tube, and an initiator therefor connected to said air bag initiator circuit to cause activation of said pyrotechnic charge when said air bag is inflated whereby the effect of said gas flow to said flattened tube from said air bag inflator device is augmented by discharge of said pyrotechnic material.

5. The combination according to claim 1 wherein said interior trim structure also includes a rigid frame surrounding said deployment opening and attached to said substrate panel, and wherein said flattened tube is located on a pedestal portion of said frame to form an integral assembly with said interior trim structure.

6. The combination according to claim 5 wherein said deployment door panel is multisided, and one side thereof is hinged to said substrate panel and the remaining sides have a perimeter portion overlying said flattened tube, said cutting edge comprising a linear feature formed atop said perimeter portion.

7. The combination according to claim 6 wherein said perimeter portion is attached to a remaining portion of said deployment door panel by a readily bendable section.

8. The combination according to claim 1 wherein said air bag receptacle is formed with an open topped channel shape extending about the perimeter thereof, and wherein said flattened tube is received in said channel shape to form an integral part of said air bag assembly.

9. A method of forming an air bag deployment opening in a covering layer of an interior trim structure having an inflatable air bag assembly mounted behind said interior trim structure, said air bag assembly including an air bag inflator device generating a flow of gas when initiated comprising the steps of:

directing a flow of pressurized gas from a gas pressure source into a flattened tube disposed to expand the same; and, cutting the covering layer by expansion of said flattened tube.

10. The method according to claim 9 further including the step of discharging a quantity of pyrotechnic material within said tube as said gas flow is diverted thereto to augment the effects thereof in expanding said flattened tube.

11. The method according to claim 9 further including the step of diverting a gas flow from said air bag inflator device to expand said flattened tube.

12. The method according to claim 9 further including the step of directing a flow of pressurized gas from a source separate from said air bag inflator device to expand said flattened tube.

* * * * *